(12) United States Patent
Wu et al.

(10) Patent No.: US 8,869,258 B2
(45) Date of Patent: Oct. 21, 2014

(54) FACILITATING TOKEN REQUEST TROUBLESHOOTING

(75) Inventors: Wei Wu, Sammamish, WA (US); Balaji Azhagiyapandiapuram, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 12/722,539

(22) Filed: Mar. 12, 2010

(65) Prior Publication Data

US 2011/0225641 A1    Sep. 15, 2011

(51) Int. Cl.
*H04L 29/06* (2006.01)
*H04L 29/14* (2006.01)
*H04L 29/08* (2006.01)

(52) U.S. Cl.
CPC ............ *H04L 63/08* (2013.01); *H04L 69/40* (2013.01); *H04L 67/146* (2013.01); *H04L 63/0884* (2013.01)
USPC ............ 726/9; 726/17; 726/20; 713/159; 713/172; 713/183; 713/185

(58) Field of Classification Search
CPC ....... H04L 63/08; H04L 69/40; H04L 67/146; H04L 63/0884
USPC .......... 713/159, 172, 183, 185; 726/17, 9, 20; 705/65–66
See application file for complete search history.

(56) References Cited

U.S. PATENT DOCUMENTS

| | | | |
|---|---|---|---|
| 6,587,853 B1 | 7/2003 | LaRue | |
| 6,892,307 B1 | 5/2005 | Wood et al. | |
| 8,051,465 B1 * | 11/2011 | Martin et al. | 726/3 |
| 2004/0103324 A1 | 5/2004 | Band | |
| 2004/0199828 A1 * | 10/2004 | Cabezas et al. | 714/39 |
| 2004/0264481 A1 * | 12/2004 | Darling et al. | 370/401 |
| 2005/0039054 A1 * | 2/2005 | Satoh et al. | 713/201 |
| 2005/0114129 A1 * | 5/2005 | Watson et al. | 704/235 |
| 2007/0101440 A1 * | 5/2007 | Bhatia et al. | 726/28 |
| 2007/0118534 A1 * | 5/2007 | Hayes et al. | 707/10 |
| 2007/0204325 A1 * | 8/2007 | Cameron et al. | 726/1 |
| 2007/0220604 A1 * | 9/2007 | Long | 726/22 |
| 2007/0283163 A1 | 12/2007 | Relyea | |
| 2008/0010287 A1 * | 1/2008 | Hinton et al. | 707/10 |

(Continued)

OTHER PUBLICATIONS

Goodrich et al., "Notarized federated identity management for web services," DBSEC'06 Proceedings of the 20th IFIP WG 11.3 working conference on Data and Applications Security pp. 133-147.*

"Troubleshooting Login Related Problems in Zen Cart", Retrieved at<<http://zencart.posterous.com/troubleshooting-login-related>>, Mar. 8, 2009, pp. 3.

(Continued)

*Primary Examiner* — Kambiz Zand
*Assistant Examiner* — Don Zhao
(74) *Attorney, Agent, or Firm* — Ben Tabor; Kate Drakos; Micky Minhas

(57) ABSTRACT

A system and method for troubleshooting errors that occur during token requests. An identity provider generates a session ID and uses the session ID when logging events that occur during handling of the request. Multiple servers, processes, or threads may use the same session ID. The session ID may be sent with an error message to the requester. An ID of one or more servers that processed the request may also be sent to the requester. Upon receiving the error message, the requester may provide the error information to an administrator, who uses the information to retrieve associated logged events.

20 Claims, 9 Drawing Sheets

(56) References Cited

U.S. PATENT DOCUMENTS

| | | | |
|---|---|---|---|
| 2008/0155665 A1* | 6/2008 | Ruppert et al. | 726/5 |
| 2008/0289020 A1* | 11/2008 | Cameron et al. | 726/9 |
| 2008/0320567 A1* | 12/2008 | Shulman et al. | 726/4 |
| 2009/0217368 A1* | 8/2009 | Buss et al. | 726/9 |
| 2009/0259753 A1* | 10/2009 | Hinton et al. | 709/226 |
| 2010/0005512 A1* | 1/2010 | Wahl | 726/4 |
| 2010/0011409 A1* | 1/2010 | Hodgkinson et al. | 726/1 |
| 2011/0270751 A1* | 11/2011 | Csinger et al. | 705/42 |

OTHER PUBLICATIONS

"SunOpenSSO Enterprise 8.0 Deployment Planning Guide", Retrieved at<<http://dic.sun.com/pdf/620-3746/820-3746pdf>>, Oct. 2009, pp. 298.

Chappell, David, "Digital Identity for .NET Applications: A Technology Overview", Retrieved at<<http://msdn.microsoft.com/en-us/library/bb882216.aspx>>, Oct. 2007, p. 1.

"Web Service Security", Retrieved at<<http://www.willydev.net/Descargas/PartnerAndPractices/WillyDev_MS_WSS_Dec_05.pdf>>, 2005, pp. 316.

* cited by examiner

FACILITATING TOKEN REQUEST TROUBLESHOOTING

BACKGROUND

Computer networks are subject to a variety of security breaches. One such type of breach occurs when a user or computer system falsely identifies itself, in order to access resources that it is not authorized to access, or to otherwise avoid being correctly associated with a request. To facilitate request authentication, a request for service directed to a party providing a resource or service, hereinafter referred to as a "relying party," includes the identity of the requester in a manner such that the relying party can verify the authenticity of the identity. Request authentication is the process of verifying the identity of the sender of a request. Authentication provides some level of security that each party's identification is accurate. The identity of the requester forms the basis for access control decisions made by the relying party.

One type of request authentication includes the use of a username and password. A stronger type of authentication involves the use of a security token. Some types of security tokens are issued by a trusted identity provider. Possession of a security token serves to provide proof of identity for the possessing party. Some security tokens have embedded cryptographic keys for stronger security.

In one type of interaction, a requester acquires a security token from an identity provider. The requester then presents the security token with a service request to a party providing a resource or service. The resource provider has a trust relationship with the identity provider that serves as assurance of the authenticity of the security token.

WS-Trust is a specification of a framework for requesting and issuing security tokens. It describes a Security Token Service (STS) that performs actions of an identity provider. A version of the WS-Trust framework is available at http://docs.oasis-open.org/ws-sx/ws-trustt/v1.4/ws-trust.html.

In some situations, a request to an identity provider may fail. The requester may not be provided with sufficient information to determine the reason for the failure. In some situations, the identifying party may have made a correct decision to deny the request. In some situations, the identifying party may have failed due to an improper configuration or other error. A requester may not receive information sufficient to determine the reason for an error, and an administrator may not have sufficient information to troubleshoot the identifying party system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to process requests for a token from a requester and facilitate troubleshooting, such as when an error occurs while processing the request. An example embodiment may include an identity provider system that receives a request for a security token, and in response, generates a session ID to be associated with the request and processing of the request. A server that generates the session ID may log one or more events, including error events, associated with the request, such that the session ID is associated with the logged event. An error message may be sent to the requester, the error message including the session ID. The session ID may subsequently be used to retrieve logged events associated with the request and the processing thereof.

In one embodiment, a proxy server may receive the request, generate the session ID, and send a request including the session ID to a security token server. The security token server may log events associated with the request and the processing thereof, such that the session ID is associated with the logged event. In the case of an error, the security token server may return an error status to the proxy server, which may send an error message including the session ID to the requester.

In one embodiment, an identifier of a proxy server or an identifier of a security token server may be sent to the requester with the error message. The identifier(s) may be subsequently be used when retrieving logged entries, for example by indicating the server to query for the entries.

In a system having more than one server that processes a request, various configurations may generate the session ID at any of the servers. In one embodiment, the session ID is generated by a proxy server and passed to a security token server. In one embodiment, a server may employ more than one thread to process the request. Each thread may use the same session ID when logging events associated with a request, such that events associated with the request processing may be retrieved regardless of the thread that performed the logging.

In one embodiment, a user that receives an error message with a session ID may provide the session ID to an administrator. The administrator may retrieve events based on the session ID. The user may also provide one or more server identifiers to the administrator, enabling the administrator to retrieve logged events from the server that processed the request and logged the events.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
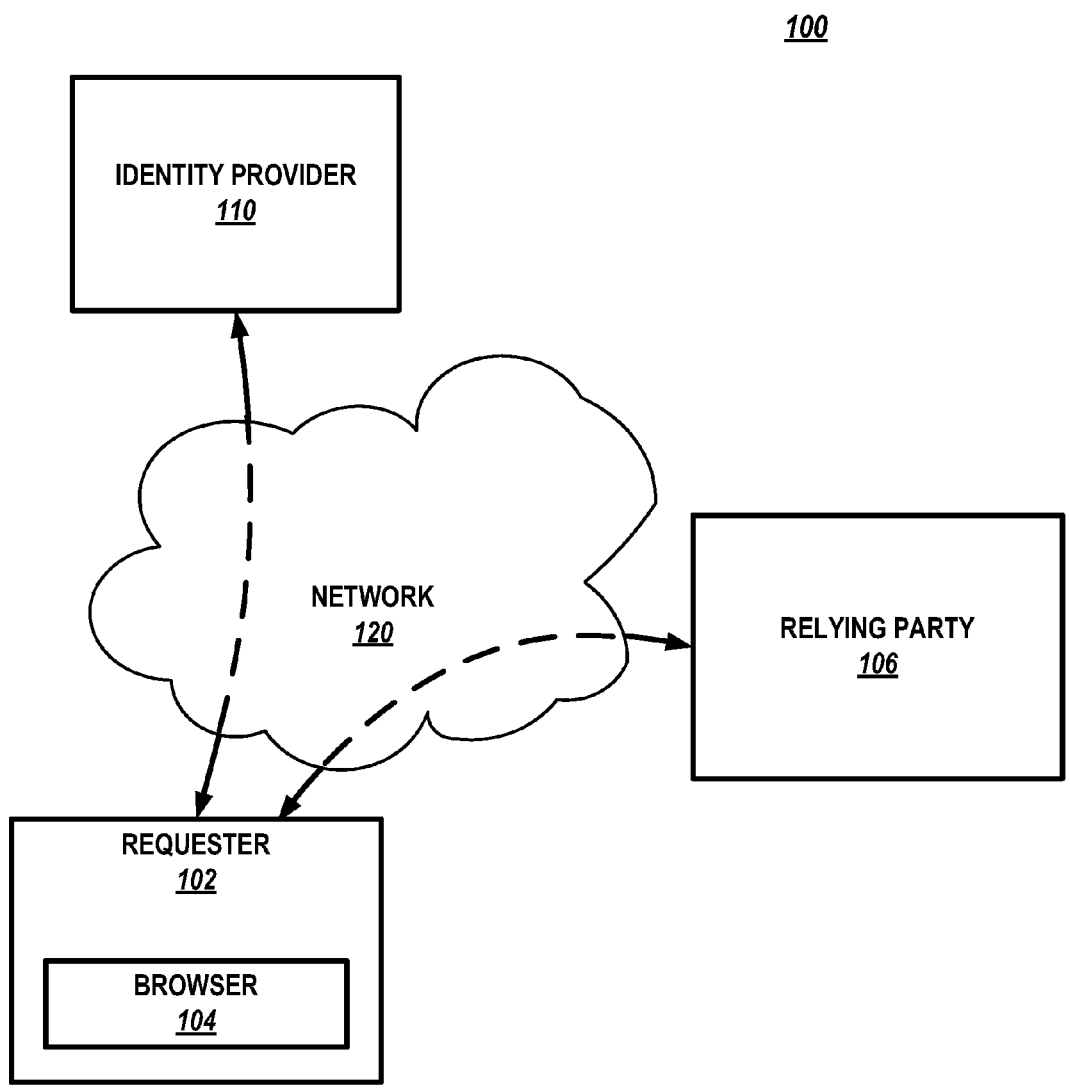
FIG. 1 is a block diagram illustrating an example embodiment of an environment in which mechanisms described herein may be practiced.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data.

As used herein, the term "authenticate" refers to confirming that facts or claims are true, to an acceptable degree of certainty. Authenticating a user or a user's identity applies to confirming that the stated identity of the user is sufficient and accurate. Authenticating a request from a user may include confirming that the identity information included with the request is accurate, that the request originated with or is authorized by the identified user, that the request has not been improperly modified, or that other information in the request is accurate. Authentication has an associated degree of certainty, allowing for a situation in which information has been authenticated yet may be inaccurate.

FIG. 1 is a block diagram of an environment 100 in which embodiments may be practiced. FIG. 1 provides a basic understanding an example environment, though many configurations may be employed and many details are not illustrated in FIG. 1. As illustrated in FIG. 1, an example environment 100 includes requester 102. Requester 102 may be a client computing device, process, or any component that requests resources or services from a remote service provider.

In the illustrated embodiment, requester 102 includes browser 104. Browser 104 may be an application that communicates with network servers or other devices to send or receive information. It may present received information in the form of a Web page, picture, video, or other visual presentation techniques. It may provide an audio presentation of received information. In one embodiment, requester 102 includes an HTTP stack (not shown). An HTTP stack may receive, process, generate, or send hypertext protocol (HTTP) messages, in accordance with HTTP standards and with at least some of the mechanisms described herein. Browser 104 may employ HTTP stack to communicate with network servers or other devices. In some embodiments, browser 104 may employ other network protocols to communicate with remote devices.

Example environment 100 includes relying party 106. Relying party 106 may be a computing device, server, or a server farm that includes multiple servers.

In one embodiment, relying party includes an HTTP stack (not shown). The HTTP stack of relying party 106 may perform actions as described for the requester HTTP stack, though the implementation of the latter and former HTTP stacks may differ, and the functions provided by each may differ.

In one embodiment, requester 102 sends one or more requests to relying party 106. A request may include some type of identifying information. The request may be a request for a resource or service. As used herein, a request for a service is considered to be a request for a resource. Relying party 106 may process the request and determine whether the request includes information to sufficiently authenticate the request or a user of requester 102. The information may be in a specific format, and is referred to as security credentials. If the security credentials are not included or are insufficient, relying party 106 may reject the request and instruct requester 102 to provide sufficient security credentials. This process is discussed in more detail herein.

Figure 3:
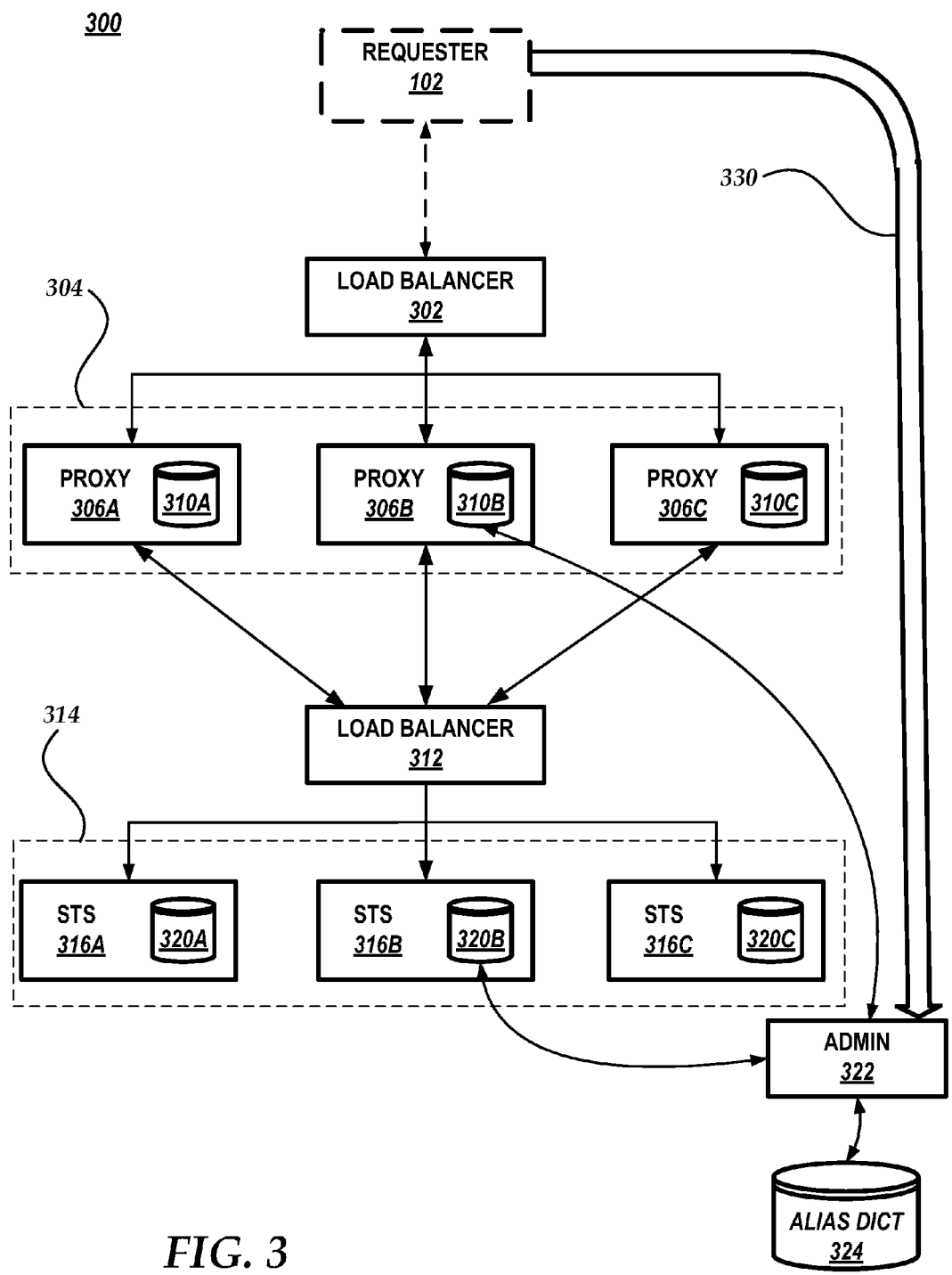
FIG. 3 is a block diagram of an example identity provider system, in accordance with some embodiments of the mechanisms described herein.

Example environment 100 includes identity provider 110. Identity provider 110 may be a computing system that issues security credentials to requester 102. The security credentials may represent claims about requester 102 that can be trusted by relying party 106. Thus, identity provider 110 is considered to be a trusted party by relying party 106. In one embodiment, the security credentials include a security token (ST), and identity provider 110 includes a security token service (STS) that provides security tokens. FIG. 3 illustrates an example embodiment of a computing system that implements identity provider 110.

One type of security token includes data that represents a collection of one or more claims about an entity, such as a user of requester 102. The claims may be considered as assertions that information associated with the claimer is accurate. This may include, for example, a name, identifier, key, group membership, a privilege, a capability, or the like.

Requester 102 may communicate with relying party 106 or identity provider 110 through network 120. Network 120 may include a local area network, a wide area network, direct connections, or a combination thereof. In one embodiment, network 120 includes the Internet, which is a network of networks. Network 120 may include wired communication mechanisms, wireless communication mechanisms, or a combination thereof. Communications between requester 102, relying party 106, or identity provider 110, with each other or other computing devices may employ one or more of various wired or wireless communication protocols, such as IP, TCP/IP, UDP, HTTP, SSL, TLS, FTP, SMTP, WAP, Bluetooth, or WLAN.

FIG. 1 is only an example of a suitable environment and is not intended to suggest any limitation as to the scope of use or functionality of the present invention. Thus, a variety of system configurations may be employed without departing from the scope or spirit of the present invention. For example, any of the functions of relying party 106 may be combined into one or more computing devices, distributed, or replicated among multiple computing devices in a variety of ways. Similarly, the functions of requester 102 may be configured in a variety of ways among one or more computing devices.

Figure 7:
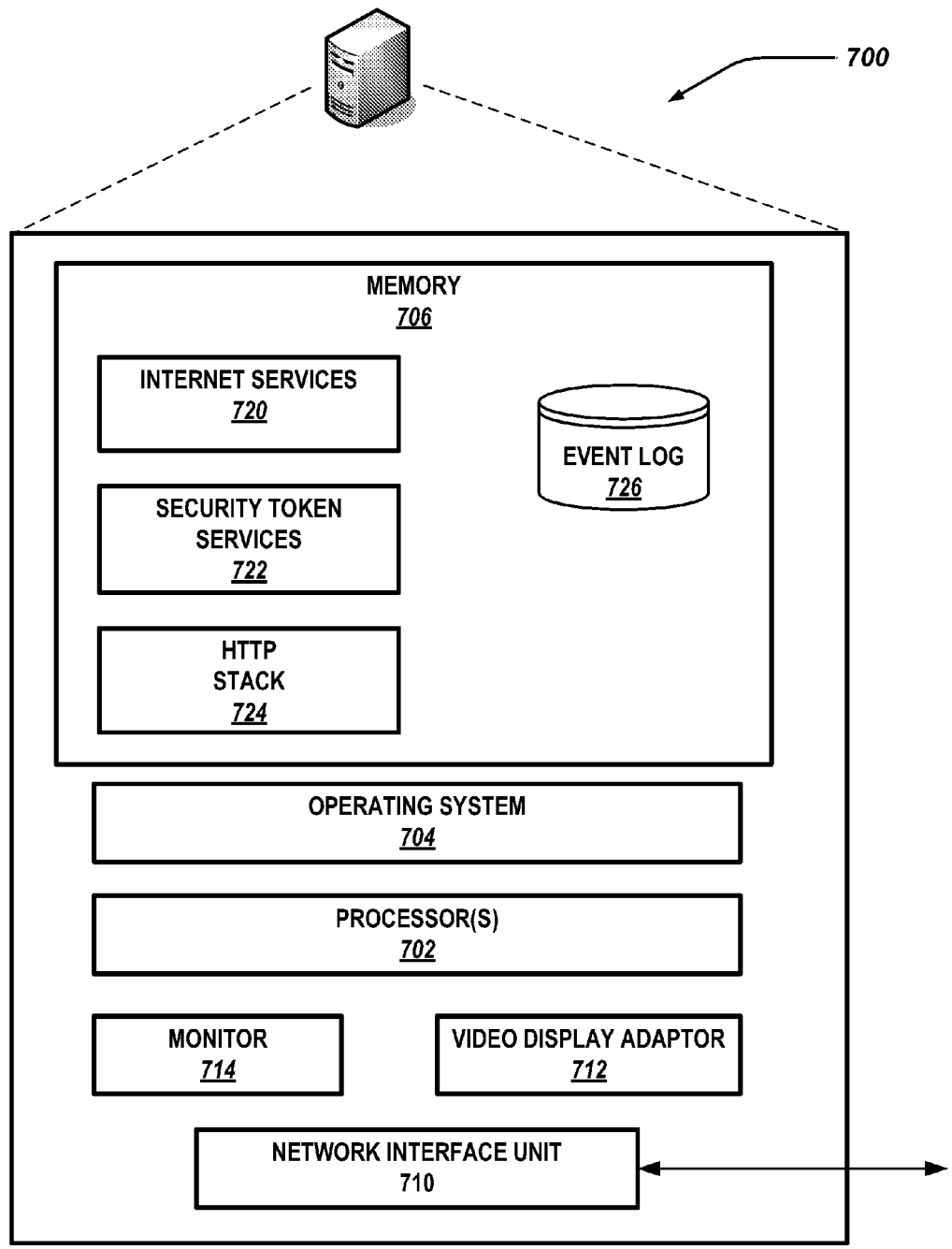
FIG. 7 shows one embodiment of a computing device, illustrating selected components of a computing device that may be used to perform functions described herein and attributed to a proxy server or a security token server.

In one embodiment, each of requester 102, relying party 106, and identity provider 110 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system. FIG. 7 illustrates an example embodiment of a computing device that may be used to implement identity provider 110, requester 102, or relying party 106.

Figure 2:
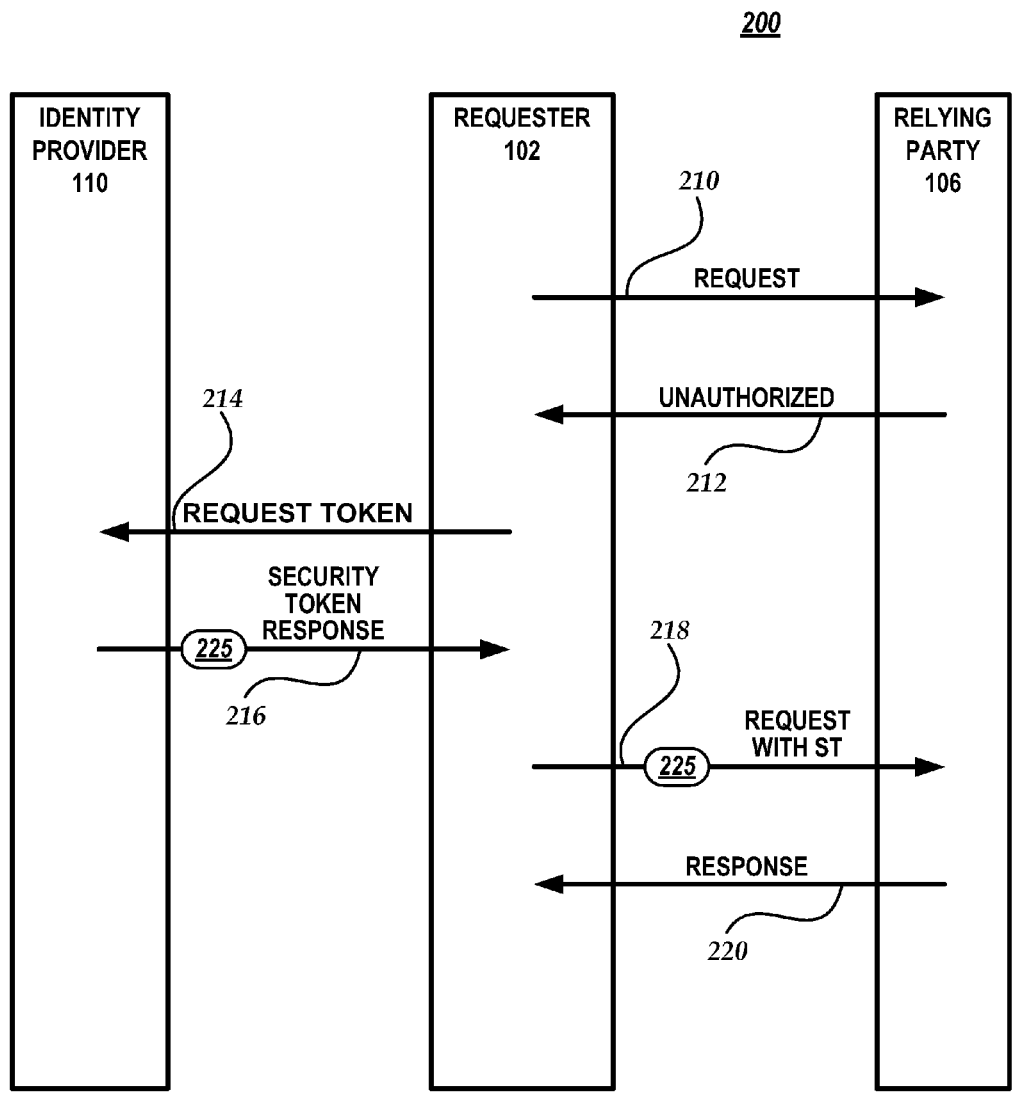
FIG. 2 illustrates an example message framework that may be used with at least some of the mechanisms described herein.

FIG. 2 illustrates an example message framework 200 that may be used with at least some of the mechanisms described herein. Message framework 200 may exist in conjunction with environment 100 of FIG. 1, or a variation thereof. As illustrated, message framework 200 includes requester 102, relying party 106, and identity provider 110. Requester 102 is in direct or indirect communication with each of relying party 106 and identity provider 110. The communication may be direct or over a network, such as network 120 (FIG. 1).

Arrows in FIG. 2 represent messages that are exchanged between the illustrated components. Moreover, in one embodiment, the reference numbers of the messages correspond to a temporal sequence in a direction from the top toward the bottom of the figure, though in various embodiments, the sequence differs. In one embodiment, each of the illustrated messages is an HTTP message, the content of which are described in more detail below.

In an example embodiment, requester 102 sends a request message to relying party 106 (Request message 210). In one embodiment, request message 210 is a request for a resource for which access is protected by an authentication process. In the example embodiment, relying party 106 receives the request message 210. Relying party 106 may determine whether the request is sufficiently authenticated. In one embodiment, this includes determining whether the request includes valid and sufficient security credentials. In one embodiment, this determination includes determining whether the request includes a proper security token and adheres to a configured scheme.

If it is determined that there are not sufficient security credentials included with the request message, an HTTP error response message may be generated and sent from relying party 106 to requester 102. In one embodiment, the HTTP error response message is an HTTP "unauthorized" message 212. This may be an HTTP 401 error message including a "WWW-Authenticate" response header. The message may include data indicating a specification of security credential that is required, or a protocol to be adhered to when sending one or more security credentials. The message may include a URL or other address identifier that indicates an identity or location of identity provider 110. In one embodiment, the message is a "redirect" message that redirects the initial request message 210 to identity provider 110.

In the example embodiment, requester 102 receives "unauthorized" message 212. In response to receiving the "unauthorized" message 212, requester 102 may attempt to acquire sufficient security credentials, in conformance with a scheme identified by relying party 106 in "unauthorized" message 212. In one embodiment, requester 102 may request a security token (ST) from a trusted identity provider, such as identity provider 110. The request may be in the form of a request ST message 214 that is sent to identity provider 110. Request ST message 214 may include security credentials or other data that may be used to authenticate a user of requester 102.

In some embodiments, identity provider may send an authentication request message to requester 102. This is illustrated in more detail in FIG. 4. In some environments, in response to receiving request ST message 214, identity provider 110 may determine that requester 102 has not provided sufficient identification data, or is otherwise not authorized to receive a security token. This action is not illustrated in FIG. 2. FIG. 2 illustrates an example environment 400 in which identity provider 110 returns the requested security token to requester 102. As shown, identity provider 110 sends ST response message 216, which includes security token 225, to requester 102. In some embodiments, a security token includes one or more cryptographic keys. Examples of key-bearing security tokens include Kerberos v5 tickets with session keys and SAML v1.1 or v2.0 tokens with holder-of-key subject confirmation.

In response to receiving a security token, requester 102 may generate and send request with security token message 218 to relying party 106. Request with security token message 218 may include a request similar to the request of request message 210. However, request with security token message 218 may include the security token 225 received from identity provider 110. In one embodiment, request with security token message 218 is similar to request message 210 with one or more additional HTTP headers that provides authentication data.

In response to receiving the request with security token message 218, relying party 106 may process the message to determine whether the request includes sufficient identification credentials and conforms to the configured authentication scheme, as discussed with regard to request message 210. If it is determined that the security credentials are sufficient, a response may be sent to requester 102, as discussed above. FIG. 2 illustrates an example sequence of messages, in which a first request message is insufficient, and a second request message is sufficient. The example sequence of messages illustrates the following sequence of messages.

Request message 210.
Unauthorized message 212.
Request ST message 214.
ST response message 216 (with security token).
Request with security token message 218 (with security token).
Response message 220.

In one embodiment, an environment may result in a sequence of messages as follows.

Request ST message 214.
ST response message 216 (with security token).
Request with security token message 218 (with security token).
Response message 220.

In the above example sequence, requester 102 may send request ST message 214; requester 102 may receive security ST response message 216; in response, requester 102 may generate and send request with security token message 218. Relying party 106 may then send response message 220. This sequence may occur, for example, in an environment in which requester 102 has previously received unauthorized message 212 in response to a prior request, or has otherwise been configured to obtain an appropriate security token and send it with an appropriate scheme in a request message. Variations of the above example process may include yet other sequences.

FIG. 3 is a block diagram of an example identity provider system 300, in accordance with some embodiments of the mechanisms described herein. Identity provider system 300 is only one example of a suitable system and is not intended to suggest any limitation as to the scope of use or functionality of the present invention. Thus, a variety of system configurations may be employed without departing from the scope or spirit of the present invention. Identity provider system 300 may be employed in an environment such as environment 100 of FIG. 1.

FIG. 3 also illustrates requester 102 in dashed lines. Though requester 102 is not necessarily a part of identity provider system 300, it is included to show context and because requester 102 may communicate with identity provider system 300. For example, request ST message 214 represents a token request from requester 102 to identity provider system 300.

As shown in the figure, identity example provider system 300 includes load balancer 302, which may receive requests such as request ST message 214 from requester 102, and distribute the requests among one or more proxy servers 306 of proxy server farm 304. Though three proxy servers 306A-C are illustrated in FIG. 3, proxy server farm 304 may include as few as one proxy or any number of proxies. As used herein, the term "proxy" refers to a proxy server.

In one embodiment a proxy server 306 may receive a request for a token and forward the request to security token server (STS) farm 314. STS farm 314 may include one or more security token servers 316. In one embodiment, a proxy server 306 may send a request for a token to STS farm 314 via load balancer 312, which may distribute requests among ST servers 316 of STS farm 314.

In one embodiment, in response to a request for a security token, proxy server 306 may send a request for identification in the form of a Web page or other mechanism. For example, a Web page may include a request for a user name and password. In response, a user of requester 102 may insert a user name and password, and send the response back to proxy server farm 304. A proxy server 306 may receive the name and password, verify that they meet configured criteria such as being non-blank or restricted to a specified character set, and send a token request to STS farm 314. It is to be noted that a proxy server 306 receiving a response from requester 102 may be the same proxy server or a different proxy server from the one that received the initial request and responded with an identification request. In some embodiments, other techniques for receiving identity information from requester 102 may be employed. In some embodiments, identification information may be received in the initial request from requester 102, and a request for identification may not be sent. In some embodiments, the initial request may be forwarded to STS farm 314.

In one embodiment, in response to receiving a token request, STS 316 may determine whether the received identity information is sufficient to provide the requested token. If the identity information is sufficient and any other configured criteria are met, STS 316 may send a security token to requester 102. The response, corresponding to security token response message 216, may be sent via load balancer 312 proxy server farm 303, and load balancer 302, or any one or more of these components. In one embodiment, a response message may be sent directly to requester 102, bypassing the illustrated components. Requester 102 may send the security token in a subsequent request to a relying party, such as request with security token message 218 sent to relying party 106.

In one embodiment, STS 316 may respond to a token request with an error status. In one embodiment, STS 316 may respond to the token request from proxy server 306 with an error status. Proxy server 306 may receive the error status and, in response, send an error message to requester 102. In one implementation, proxy server 306 may generate a Web page that includes an error message, the error message including additional information to facilitate a determination of detailed information relating to the error. The detailed information may include identification of a specific STS that caused the error, information descriptive of the error, or various other types of information. Mechanisms described herein facilitate the generation and use of the additional information that may accompany an error message in response to a token request.

Communication between proxy servers 306 and security token servers 316 may employ the same communication protocol or a different communication protocol from that used between requester 102 and proxy servers 306. This may include a standard communication protocol or a private proprietary protocol. The mechanisms described herein may be employed with any of a variety of communication protocols or mechanisms.

In one embodiment, proxy server 306 may generate a session ID corresponding to a received token request and associate the session ID with entries logged to event log 310. Proxy server 306 may send the generated session ID to security token server 316. For example, the session ID may be sent with the token request sent from proxy server 306 to security token server 316. Security token server 316 may associate the session ID with entries logged to event log 320. Entries logged to event logs 310 or 320 may include information such as a description of an error, an identification of the requester or the request, or other information.

In the illustrated example embodiment, each proxy server 306 has a corresponding event log 310, and each security token server 316 has a corresponding event log 320. In one embodiment, proxy servers 306 or security token servers 316 may employ an event logging component to log various events. Each proxy server 306 or security token server 316 may send a session ID to the event logging component, which associates the session ID with the logged event information in each event log.

An event log may include one or more files, a software component that stores information in the files, and an API that is used by the server to store or retrieve information. One example of an event logging component is Event Tracing for Windows® (ETW), by Microsoft Corporation. ETW is an operating system component that may be used by applications to log events such as those described herein. Though FIG. 3 illustrates an event log integrated with each proxy server 306 or security token server 316, in some implementation, an event log may be shared by multiple servers.

In one embodiment, an error message sent to requester 102 may include the session ID used during handling of the request from requester 102. This provides requester 102 with a key that may be subsequently used to retrieve information relating to the error. In one embodiment, proxy server 306, in response to receiving an initial token request or a subsequent message with identifying information, such as user name and password, may generate a session ID. In response to the proxy server determining an error or the proxy server receiving an error status from a security token server, the proxy server may include the session ID with the error message. For example, the proxy server may generate a Web page that includes the session ID.

In one embodiment, in response to an error, a proxy server may send an identifier that corresponds to the security token server 316 that handled the request and returned the error status. In one embodiment, it may be desirable to send the requester 102 an alias that identifies the security token server in an obfuscated way. For example, an alias may use a hash value of a server name or another value that provides security to the system. In one embodiment, alias dictionary 324 may store correspondences between each alias and each security token server. Each security token server may be configured with an alias that corresponds to itself, or a security token server may request an alias from alias dictionary 324. Each security token server may have one or more associated aliases. As used herein, the term "identifier" may refer to aliases or other identifiers that may be used to identify a specific server or group of servers.

In one embodiment, a proxy server may send an identifier of the proxy server to the requester 102. As discussed for the security token server, a proxy server may have one or more associated aliases and send an alias to requester 102. Proxy server aliases may be stored in alias dictionary 324.

FIG. 3 further includes administrator 322. In one embodiment, in response to receiving an error message, requester 102 provides administrator 322 with information received with the error message. As discussed, this information may include an identification of the security token server 316 or proxy server 306 that processed the token request from requester 102. The information may include a session ID corresponding to the token request. Requester 102 may provide this information to administrator in an out of band communication 330, such as by email, various messaging services, or other electronic communication. The information may be provided manually, such as by a phone call, direct communication, or the like.

In response to receiving information associated with a token request and corresponding error message, administrator 322 may use the information to troubleshoot the error. This may include retrieving logged information corresponding to the handling of the request. In one embodiment, administrator 322 may access alias dictionary 324 to determine a security token server 316 or a proxy server 306 based on a security token server alias or proxy server alias received from requester 102. Administrator 322 may use the security token server identification or the proxy server identification together with the session ID to retrieve information from one or more event logs 310 or 320 corresponding to the identified servers. Administrator 322 may then use the retrieved information to determine whether the error indicates a problem that needs correction.

It is to be noted that though the discussion above described examples of errors produced by a security token server, in some configurations an error may be triggered by a proxy server 306. In such a situation, administrator 322 may receive a proxy server identifier without a security token server identifier, and perform information retrieval actions as described above with respect to proxy server information.

It is also to be noted that in some configurations, an error may be a result of a correct operation of identity provider system 300. For example, a requester's identification information may be insufficient to respond with a security token. In such a case, administrator 322 may determine that a correction is not to be performed.

Figure 4:
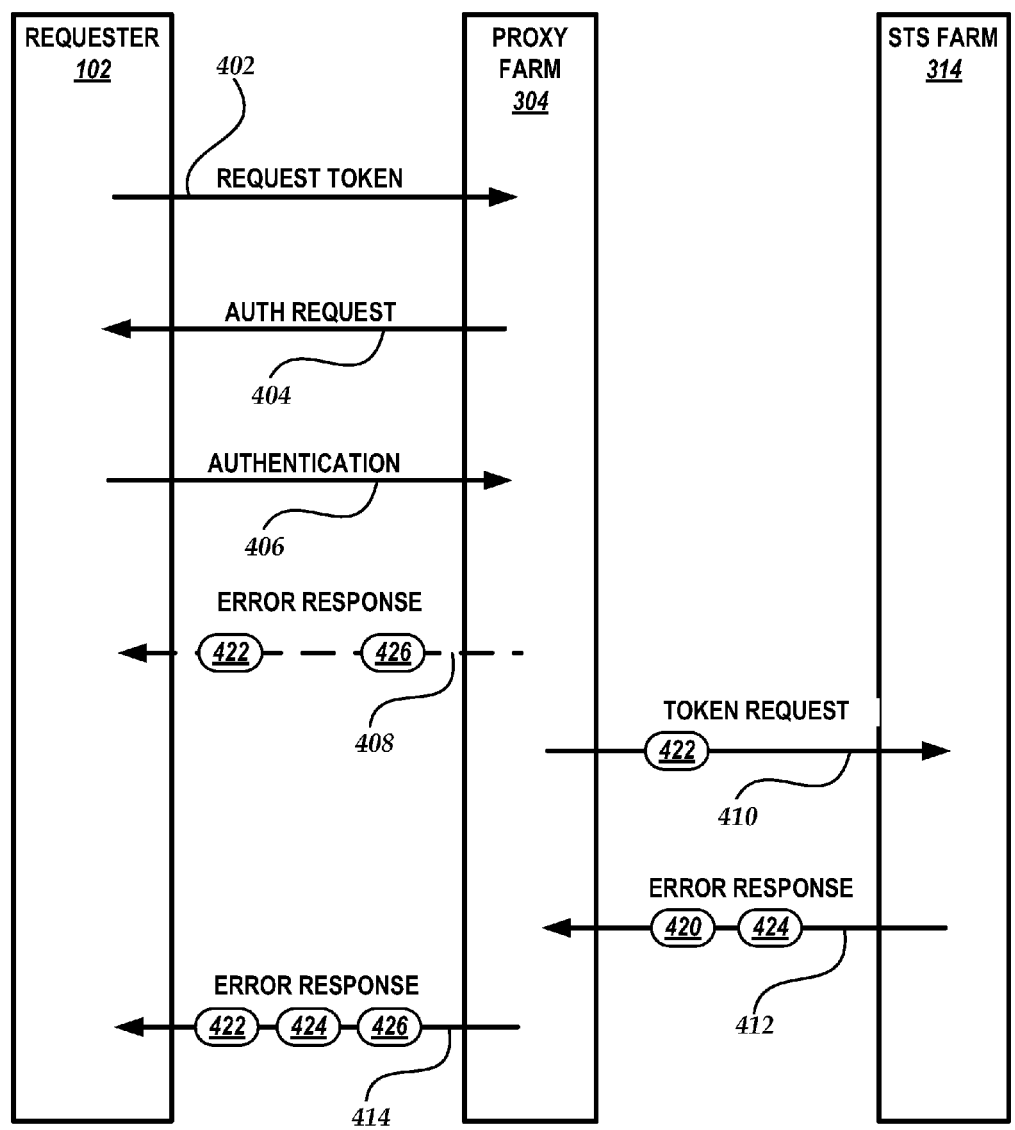
FIG. 4 illustrates an example environment in which embodiments may be practiced.

FIG. 4 illustrates an example environment 400 in which embodiments may be practiced. Environment 400 may exist in conjunction with environment 100 of FIG. 1, message framework 200 of FIG. 2, or variations thereof. As illustrated, environment 400 includes requester 102, proxy server farm 304, and security token server farm 314. Servers of proxy server farm 304 are in direct or indirect communication with each of requester 102 and servers of security token server farm 314, as illustrated in FIG. 3. Proxy farm 304 is used in FIG. 4 to indicate that any one or more proxy servers 306 may send or receive the illustrated messages. Similarly any one or more ST servers 316 may send or receive the illustrated messages corresponding to STS farm 314.

Arrows in FIG. 4 represent messages that are exchanged between the illustrated components. Moreover, in one embodiment, the reference numbers of the messages correspond to a temporal sequence in a direction from the top toward the bottom of the figure, though in various embodiments, the sequence may differ. As discussed herein, the messages may employ any of a variety of communication protocols, such as HTTP.

Figure 5A:
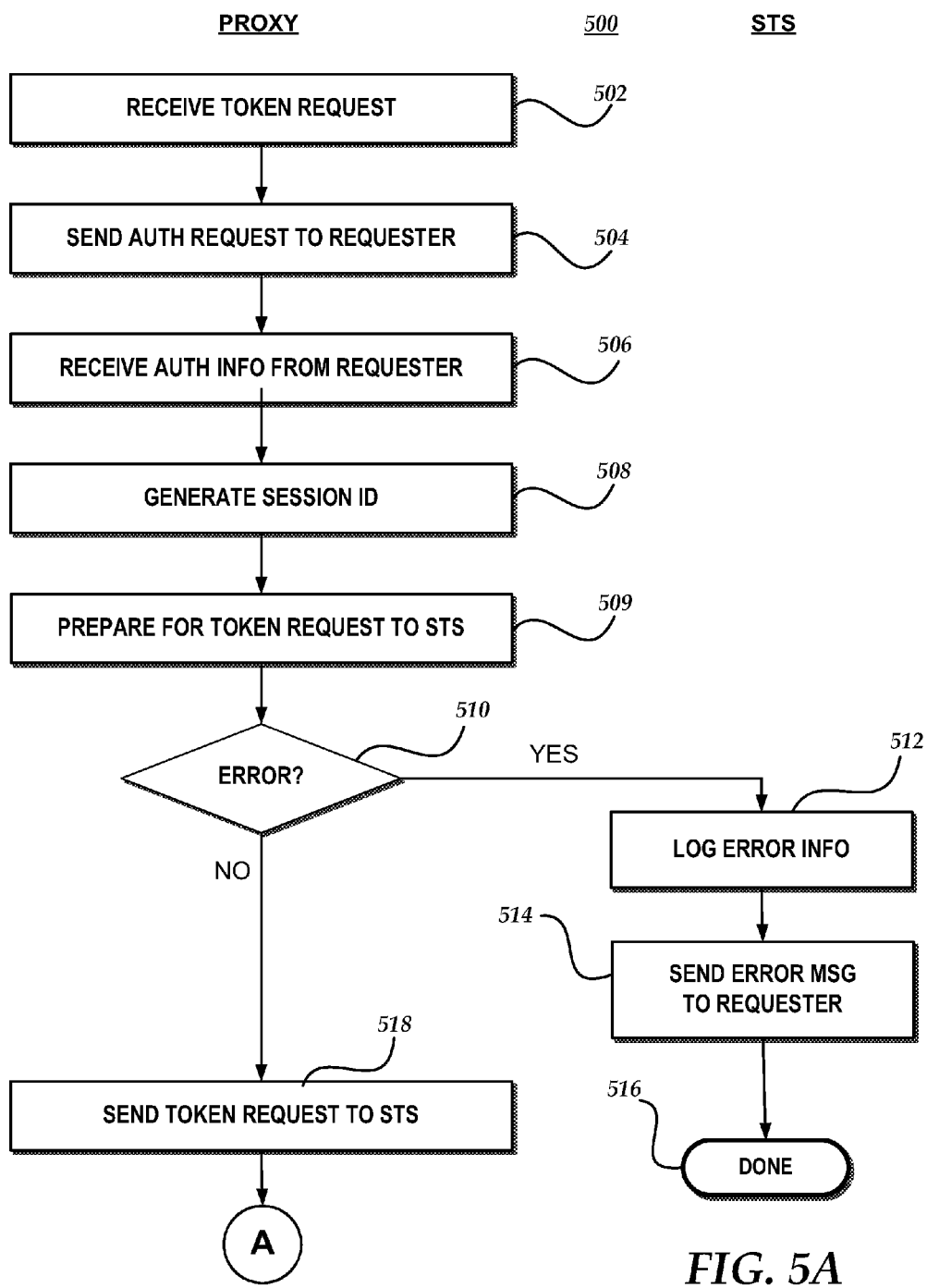
FIGS. 5A-C contain a flow diagram illustrating an example embodiment of a process of facilitating troubleshooting of token request errors.
Figure 5B:
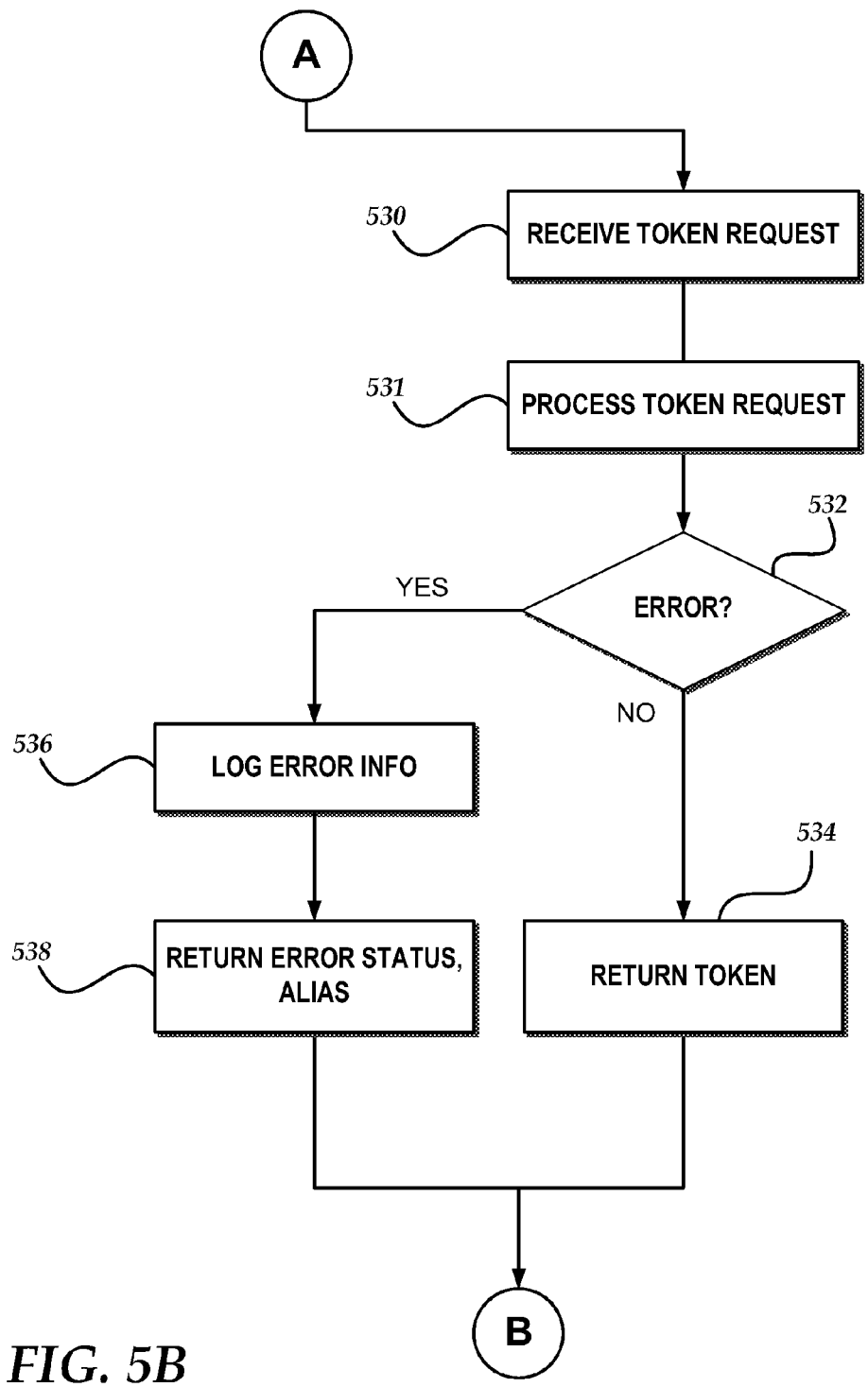
Figure 5C:
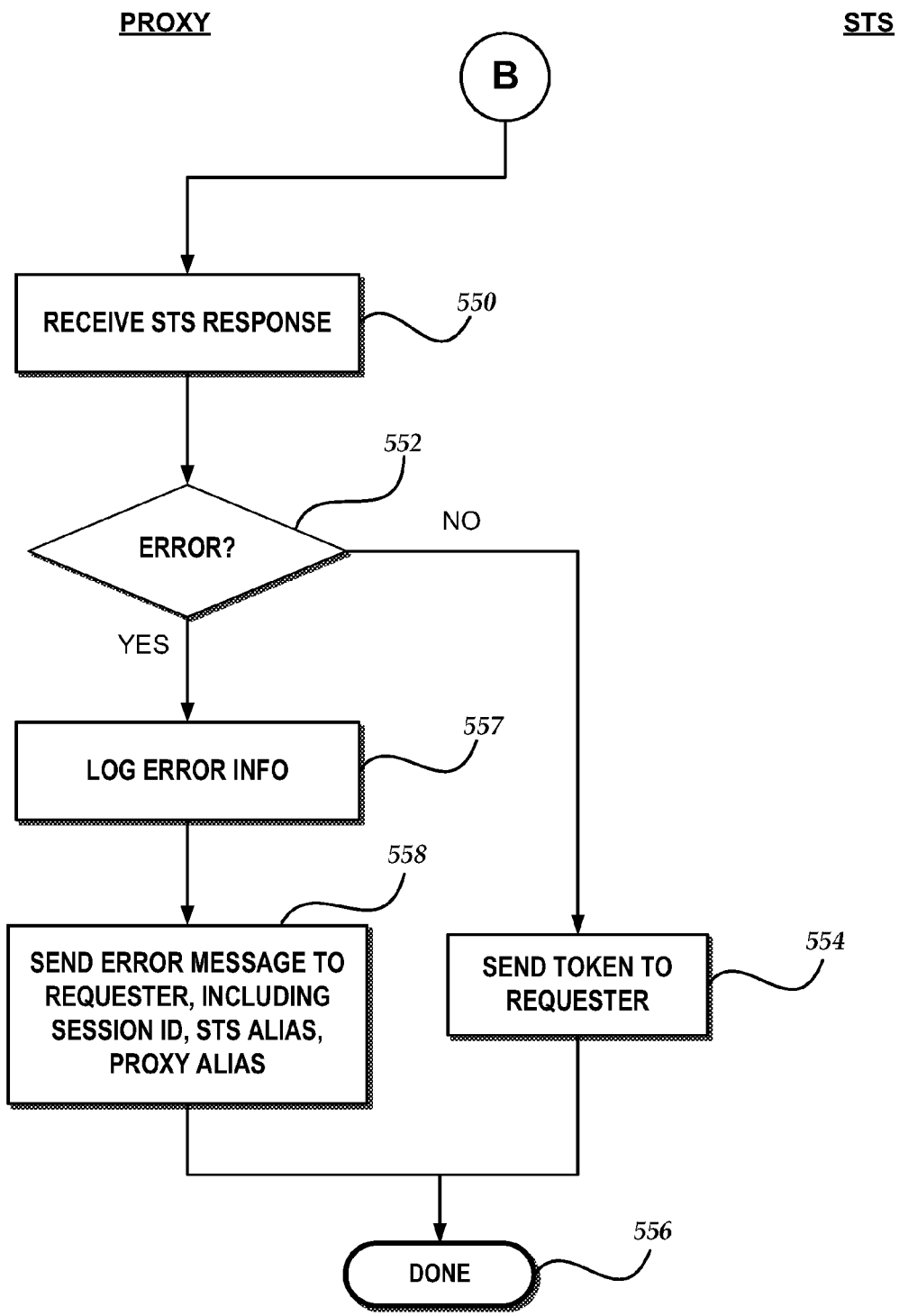

The messages of FIG. 4 are discussed in conjunction with FIGS. 5A-C. FIGS. 5A-C contain a flow diagram illustrating an example embodiment of a process 500 of facilitating troubleshooting of token request errors. In one embodiment, some of the actions of process 500 are performed by one or more proxy servers of proxy server farm 304, and are represented in the left column of FIGS. 5A-C under the header "Proxy." Other actions of process 500 are performed by one or more security token servers of STS farm 314, and are represented in the right column of FIGS. 5A-C under the header "STS." However, in various embodiments, the correspondence between actions and servers may differ. Some of the actions of process 500 relate to sending or receiving messages illustrated in FIG. 4. The following discussion references messages of FIG. 4. In various implementations, each of the messages of FIG. 4 may represent one or more messages.

In the discussion of process 500, references to proxy server 306 may refer to any proxy server 306 of proxy server farm 304. Similarly, references to security token server 316 may refer to any security token server 316 of STS farm 314.

The illustrated portions of process 500 may be initiated at block 502, where proxy server 306 receives a token request message 402 from requester 102. The process may flow to block 504, where proxy server 306 sends an authentication request message 404 to requester 102. In one embodiment, authentication request message may include a Web page, script, or other representation of a form that includes a request for a user name and password. In some embodiments, other authentication information may be requested, such as a security certificate, a digital signature, or the like. Some authentication requests may be designed to cause a person to respond, while some authentication requests may be automatically handled by requester 102. In some embodiments, request authentication may include an exchange of multiple messages between proxy server 306 and requester 102.

Process 500 may flow to block 506, where authentication message 406, including authentication information, is received from requester 102. The process may flow to block 508 where, in response to receiving the authentication information, proxy server 306 may generate a session ID. In one embodiment, a session ID is generated in a manner such that it may be trusted to be unique among session IDs employed by the system, or at least unique within a reasonable time period.

Though not illustrated, in one embodiment, authentication information may be included in the initial token request message 402, such that authentication request message 404 and authentication message 406 are not employed, and the actions of block 506 are combined with block 502.

In response to receiving authentication information, proxy server 306 may perform a validity test on the authentication information. For example, it may determine whether the information meets some configured criteria for formatting, character sets, encoding, or the like.

Process 500 may flow to decision block 509, where data is prepared to send a token request message to an STS.

Process 500 may flow to decision block 510, where a determination is made of whether there is an error in processing the token request and authentication information. Some types of errors may result from improper or incomplete authentication information. Some types of errors may result from an improper system configuration, insufficient resources, or other system errors. For example, proxy server 306 may fail due to insufficient memory or another resource.

It is to be noted that, although decision block 510 is illustrated as a single decision block, in some implementations, this determination may be made any number of times, as a result of various types of processing. For example, an error may occur during the actions of preparing data to send a token request to the STS, in block 518, or during another action of process 500. Decision block 510 is to be considered to include one or more determinations of error as a result of process 500.

If, at decision block 510, it is determined that an error has occurred, the process may flow to block 512, where information relating to the request or the error may be logged. Logging this information may be performed such that it is associated with the session ID generated at block 508. For example, the session ID may be passed to an event trace mechanism with a command to log the error, or it may be sent prior to logging the error in a manner that enables associating the session ID with the error logging. For example, a session ID may be associated with a specific thread such that subsequent event logging on the same thread uses the associated session ID. In another example, a session ID may be passed in a function call to log the error event.

In some embodiments, actions performed by proxy server 306 may occur in multiple software or hardware threads, multiple processes, or in multiple processors. Thus, logging of events may be performed by different threads, processes, or processors. The session ID may be used to associate log entries with the session ID, regardless of whether multiple logging actions are initiated by different threads, processes, or processors.

The process may flow to block 514, where proxy server 306 may send an error response message 408 to requester 102. In one embodiment, error response message 408 may include the session ID 422 or proxy identifier 426. As discussed herein, the proxy identification may be in the form of an alias corresponding to the proxy server.

Process 500 may flow to done block 516, and exit or return to a calling program.

If, at decision block 510, it is determined that an error warranting aborting the token request process does not exist, the process may flow to block 518, where the proxy server 306 may send a token request message 410 to a security token server 316. The token request may include the authentication information received by proxy server 306 from requester 102. The token request may include the session ID 422 generated by proxy server 306. Process 500 may flow to point "A" and continue at point "A" in FIG. 5B.

Process 500 may flow to block 530, where an STS 316 receives a token request from proxy server 306. The process may flow to block 531, where the token request is processed. In response to receiving authentication information, proxy 305 may perform a validity test on the authentication information. This may include determining whether the authentication information is sufficient to authenticate requester 102 or whether requester 102 is authorized to receive the requested token. The actions of block 531 may include authentication, generation of a security token, or other processing.

Process 500 may flow to decision block 532, where a determination is made of whether there is an error in processing the token request and authentication information. As discussed with respect to decision block 510, some types of errors may result from improper or incomplete authentication information; some types of errors may result from an improper system configuration, insufficient resources, or other system errors. An error may also result because requester 102 is not authorized to receive the requested token.

As discussed with respect to decision block 510, the determination of decision block 532 may be made any number of times, as a result of various types of processing.

If, at decision block 532, it is determined that an error has occurred, the process may flow to block 536, where information relating to the request or the error may be logged. Logging this information may be performed such that it is associated with the session ID generated at block 508 and passed from proxy server 306 to STS 316 in token request message 410. As discussed herein, this may include passing an event logger the session ID in the error logging invocation or in a previous call to the event logger.

In some embodiments, actions performed by STS 316 may occur in multiple software or hardware threads, multiple processes, or in multiple processors. Thus, logging of events may be performed by different threads, processes, or processors. The session ID may be used to associate log entries with the session ID, regardless of whether multiple logging actions are initiated by different threads, processes, or processors.

The process may flow to block 538, where STS 316 may return error response message 412 to proxy server 306. Error response message 412 may include an error status 420 or STS identifier 424. As discussed herein, the STS identification may be in the form of an alias corresponding to the STS. Process 500 may flow to point "B" and continue at point "B" in FIG. 5C.

If, at decision block 532, it is determined that an error warranting aborting the token request process does not exist, the process may flow to block 534, where STS 316 may generate a security token and send the security token to proxy server 306 for forwarding to requester 102. A message representing a returned security token is not illustrated in FIG. 4. Process 500 may flow to point "B" as described above.

As illustrated in FIG. 5C, from point "B," process 500 may flow to block 550, where proxy server 306 receives a response from the STS 316. This may be error response message 412 or a token response. The process may flow to decision block 552, where proxy server 306 may determine, based on the received STS response, whether an error occurred.

If, at decision block 552, it is determined that an error did not occur, the process may flow to block 554, where the security token is sent to requester 102. Requester 102 may use the received security token in a subsequent request for resources to a relying party, as illustrated in FIG. 1. The process may flow to done block 556, and exit or return to a calling program.

As discussed with respect to decision block 510, the determination of decision block 552 may be made any number of times, as a result of various types of processing.

If, at decision block 552, it is determined that an error occurred, the process may flow to block 557, where information relating to the request or the error may be logged. Logging this information may be performed such that it is associated with the session ID received from proxy server 306 in token request message 410. As discussed herein, this may include passing an event logger the session ID in the error logging invocation or in a previous call to the event logger.

The process may flow to block 558, where an error response message 414 is sent to requester 102. In one implementation, error response message 414 includes the session ID 422 that is associated with entries logged by proxy server 306 or STS 316. In one implementation, error response message 414 may include STS identifier 424, as described herein. In one implementation, error response message 414 may include proxy identifier 426, as described herein.

In one implementation, error response message 414 includes a Web page that indicates an error occurred. The Web page may include one or more of the session ID, STS identifier, or proxy identifier.

It is to be noted that, though the example embodiments illustrated herein show a proxy server farm 304 and a security token server farm 314 various embodiments may be configured in different ways. For example, one configuration may include security token servers that perform at least some of the actions of the proxy servers described herein, such that communication between a proxy server and a security token server is not employed. Some configurations may include additional intermediate servers performing actions, such that errors may be determined at more than two servers. An error response may thus include identifiers of more than two servers. In some configurations, load balancer 302, load balancer 312, or another intermediate computing device may perform some of the actions described herein with respect to proxy server 306 or security token server 316.

Figure 6:
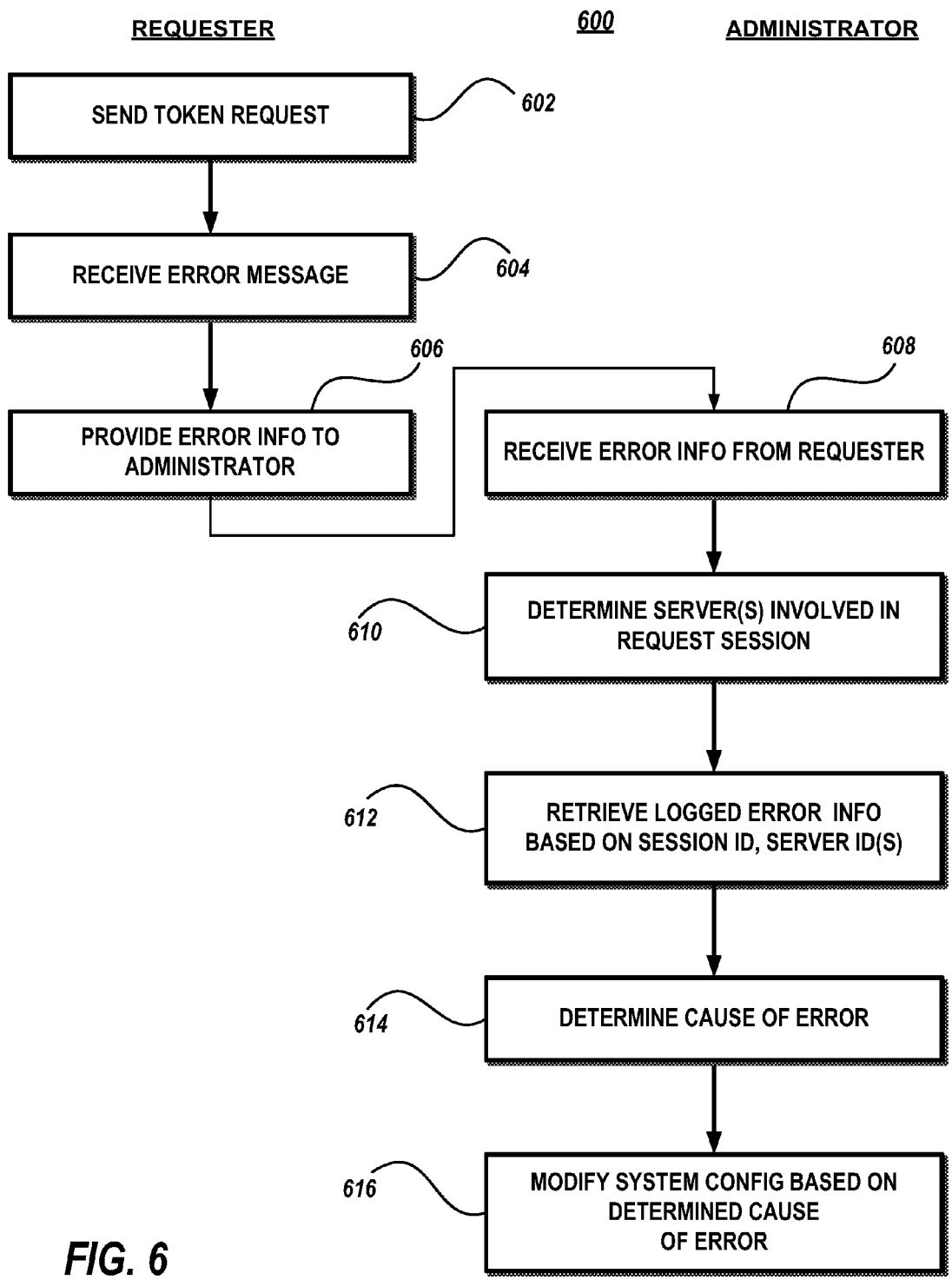
FIG. 6 is a flow diagram of a process for troubleshooting an error message received in response to a token request.

FIG. 6 is a flow diagram of a process 600 for troubleshooting an error message received in response to a token request. In one embodiment, some of the actions of process 600 are performed by a requester, such as requester 102, and are represented in the left column of FIG. 6 under the header "Requester." Other actions of process 600 are performed by a system administrator, and are represented in the right column of FIG. 6 under the header "Administrator." However, in various embodiments, the correspondence between actions and entities may differ. The following discussion references messages of FIG. 4.

The illustrated portions of process 600 may be initiated at block 602, where requester 102 sends a token request to an identity provider. Token request message 402, of FIG. 4, is an example of such a request. Process 600 may flow to block 604, where an error message is received. Error response message 414, received by requester 102, is an example of an error response. An error response may include error information, such as a session ID. As illustrated by error response message 414, the error information may include one or more server identifiers. In particular, it may include an identifier of a security token server or a proxy server of an identity provider.

Process 600 may flow to block 606, where the requester provides the error information to a system administrator. This may be done using any out of band communication, such as email, various messaging mechanisms, or manually by a phone call or in person.

Process 600 may flow to block 608, where the administrator receives the error information. The process may flow to block 610, where the administrator determines one or more servers that were involved in a request session that resulted in an error. This may include a security token server, a proxy server, another type of server, or a combination thereof. In one embodiment, the actions of block 608 including retrieving data from an alias dictionary, such as alias dictionary 324 of FIG. 3, the alias dictionary storing associations between server aliases and servers. The error information may, for example, include one or more server aliases.

The process may flow to block 612, where logged error information associated with the token request session may be retrieved, based on a session ID included in the error information. The retrieval may further be based on the one or more server IDs included in the error information, or the server IDs retrieved from the alias dictionary. In one embodiment, the actions of block 612 may include communicating with the indicated security token server or proxy server and retrieving entries associated with the session ID, as described herein.

The process may flow to block 614, where an administrator may determine a cause of the error. In some situations, the error may be caused by a desirable execution of the identity provider logic, such as an inadequate identification provided by the requester. In some situations, the error may be caused by a security token server or proxy server that did not adequately perform the desired logic of the token request process. The administrator may determine whether a system modification is desirable. In such a situation, the process may flow to block 616, where the administrator may cause a modification of the system configuration based on the determined cause of the error. Modification may include one or more actions such as restarting one or more servers, modifying program code stored on one or more server, modifying system configurations, or other changes to hardware or software of the system. The process may then exit.

FIG. 7 shows one embodiment of a computing device 700, illustrating selected components of a computing device that may be used to perform functions described herein and attributed to proxy server 306 or security token server 316 of identity provider system 300. Computing device 700 may include many more components than those shown, or may include less than all of those illustrated. Computing device 700 may be a standalone computing device or part of an integrated system, such as a blade in a chassis with one or more blades.

As illustrated, computing device 700 includes one or more processors 702, which perform actions to execute instructions of various computer programs. In one configuration, each processor 702 may include one or more central processing units, one or more processor cores, one or more ASICs, cache memory, or other hardware processing components and related program logic. As illustrated, computing device 700 includes an operating system 704. Operating system 704 may be a general purpose or special purpose operating system. The Windows® family of operating systems, by Microsoft Corporation, of Redmond, Wash., are examples of operating systems that may execute on computing device 700.

Memory 706 may include one or more of a variety of types of non-transitory computer storage media, including volatile or non-volatile memory, RAM, ROM, solid-state memory, disk drives, optical storage, or any other medium that can be used to store digital information. In one configuration, memory 706 may store Internet services module 720, which includes program instructions to perform at least some of the actions of proxy server 306 when handling a token request. It may, for example, generate and send authentication requests or error responses in the form of a Web page, or log error events. Memory 706 may store security token services module 722, which includes instructions to perform at least some of the actions of a security token server as described herein. It may, for example, verify a requester's authentication information, generate security tokens, log error events, or send error responses. Memory 706 may store HTTP stack 724, which performs actions to employ the HTTP protocol. Memory 706 may store event log 726, which may include one or more files storing event information, as well as program instructions to interface with the one or more files. In some configurations, any one or more of these components, or a portion thereof, may be implemented in hardware, software, or a combination thereof.

Computing device 700 may include a video display adapter 712 that facilitates display of localized text strings to a user, or a speech component (not shown) that converts text to audio speech and presents the spoken strings to a user. Though not illustrated in FIG. 7, computing device 700 may include a basic input/output system (BIOS), and associated components. Computing device 700 may also include a network interface unit 710 for communicating with a network. Embodiments of computing device 700 may include one or more of a display monitor 714, keyboard, pointing device, audio component, microphone, voice recognition component, or other input/output mechanisms.

It will be understood that each block of the flowchart illustration of FIGS. 5A-C and 6, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of processing a request for a security token, the method comprising:
    a) receiving, at an identity provider system, the request from a requester;
    b) generating, at the identity provider system, a session ID, the session ID associated with processing of the request;
    c) logging one or more events associated with the processing of the request, the logging including associating the session ID with each of the one or more events; and
    d) sending, from the identity provider system, a markup language page that includes an error message to the requester, the error message including the session ID and enabling retrieval of the one or more events, the markup language page enabling display of the error message, including the session ID, at a client computing device.

2. The computer-based method of claim 1, the identity provider system comprising a first server and a second server, the method further comprising:
    a) generating the session ID at the first server; and
    b) sending the session ID from the first server to the second server;
    wherein logging the one or more events is performed by the second server.

3. The computer-based method of claim 1, the identity provider system comprising a first server and a second server, the method further comprising sending the session ID from the first server to the second server, and logging the one or more events comprises logging at least one event from the first server and logging at least one other event from the second server.

4. The computer-based method of claim 1, further comprising sending to the requester an identifier of at least one server of the identity provider system, the at least one server performing the logging of the one or more events.

5. The computer-based method of claim 1, the identity provider system comprising at least one proxy server and at least one security token server, the method further comprising generating the session ID at the at least one proxy server, sending the session ID from the at least one proxy server to a security token server of the at least one security token server, returning an error status from the security token server, and logging the at least one event by the security token server.

6. The computer-based method of claim 1, further comprising, after the error message is received by the requester:
  a) at the requester, providing the session ID to an administrator;
  b) receiving the session ID from the requester; and
  c) employing the session ID received from the requester to retrieve the one or more events associated with the processing of the request.

7. The computer-based method of claim 1, the error message further including at least one identifier of at least one server of the identity provider system, the at least one server performing the logging of the one or more events, the method further comprising after sending the error message to the requester, receiving the session ID from the requester out of band and employing the session ID and the at least one identifier to retrieve the logged one or more events.

8. The computer-based method of claim 1, the identity provider system comprising at least one proxy server and a plurality of security token servers, the method further comprising generating the session ID at the at least one proxy server, sending the session ID from the at least one proxy server to a security token server of the plurality of security token servers, returning an error status from the security token server, logging the one or more events by the security token server, sending the requester a Web page that includes an identifier of the security token server, and employing the identifier of the security token server to retrieve the logged one or more events.

9. The computer-based method of claim 1, logging the one or more events comprising logging a first event from a first thread and logging a second event from a second thread, the session ID associated with the first event and the second event.

10. A computer-based system for processing a request for a token, the system comprising:
  a) a first server that receives the request for the token from a requester;
  b) a second server that selectively provides the requested token;
  the first server configured to perform actions including:
  c) generating a session ID;
  d) sending the session ID and a request for the token to the second server; and
  e) in response to receiving an error status from the second server, sending an error message to the requester, the error message including the session ID and an identifier associated with the second server, wherein sending the error message to the requester comprises sending a Web page that comprises the session ID and the identifier associated with the second server; and
  the second server configured to perform actions including logging one or more events associated with the request, logging including associating each of the one or more events with the session ID.

11. The computer-based system of claim 10, the second server configured to perform actions including:
  a) in response to receiving the request for the token, selectively providing the requested token;
  b) sending the identifier associated with the second server to the first server.

12. The computer-based system of claim 10, the second server configured to perform actions including:
  a) employing two or more threads to process the request for the token; and
  b) logging one or more events from each of the two or more threads, the logging including associating each of the logged events with the session ID.

13. The computer-based system of claim 10, further comprising generating, at a proxy server, the Web page including the error message, wherein sending, to the requester, the error message comprises sending, from the proxy server to the requester, the Web page.

14. The computer-based system of claim 10, further comprising an interface that enables retrieving one or more of the logged events based on the session ID and the identifier associated with the second server.

15. The computer-based system of claim 10, wherein the identifier associated with the second server obfuscates the identity of the second server.

16. A computer-readable hardware storage medium comprising computer program instructions for processing a request for a token from a requester, the program instructions executable by one or more processors to perform actions including:
  a) receiving, at first server, the request;
  b) generating a session ID for association with the request;
  c) sending the session ID from the first server to a second server;
  d) at the second server, selectively providing the token;
  e) logging information associated with processing of the request;
  f) if an error has occurred, sending a Web page including an error message to the requester, the Web page including the session ID; and
  g) enabling subsequent retrieval of the logged information based on the session ID included in the Web page.

17. The computer-readable hardware storage medium of claim 16, wherein the actions further include if an error occurs at the first server, logging error information associated with the processing of the request at the first server; and if an error occurs at the second server, logging the error information associated with the processing of the request at the second server; and wherein the subsequent retrieval of the logged information includes the error information.

18. The computer-readable hardware medium of claim 16, wherein the token is a security token, and wherein selectively providing the token comprises determining whether the requester is authorized to receive the security token.

19. The computer-readable hardware storage medium of claim 16, wherein the first server is a proxy server and the second server is a security token server, the error message including an identifier of the security token server and an identifier of the proxy server.

20. The computer-readable hardware storage medium of claim 16, wherein the error message further includes an identifier of the first server or the second server, the identifier facilitating the subsequent retrieval of the logged information.

* * * * *